United States Patent [19]

Debuisschert et al.

[11] Patent Number: 5,444,571
[45] Date of Patent: Aug. 22, 1995

[54] NON-LINEAR OPTICAL DEVICES

[75] Inventors: Thierry Debuisschert, Orsay; Jean-Paul Pocholle, Arpajon/La Norville; Michel Papuchon, Villebon, all of France

[73] Assignee: Thomson-CSF, Puteaux, France

[21] Appl. No.: 910,529

[22] Filed: Jul. 8, 1992

[30] Foreign Application Priority Data

Jul. 9, 1991 [FR] France ................ 91 08604

[51] Int. Cl.⁶ .................... G02F 2/02; G02B 5/18
[52] U.S. Cl. ...................... 359/566; 359/328; 372/22; 372/92; 372/105; 372/108
[58] Field of Search ............... 359/222, 896, 566, 574, 359/328; 372/21, 22, 32, 70, 71, 72, 92, 93, 94, 99, 100, 102, 66, 20, 105, 108, 9, 29; 385/122

[56] References Cited

U.S. PATENT DOCUMENTS

| | | |
|---|---|---|
| 3,140,451 | 7/1964 | Fox . |
| 3,725,809 | 4/1973 | Ulrich et al. . |
| 4,731,787 | 3/1988 | Fan et al. ............... 372/22 |
| 4,739,507 | 4/1988 | Byer et al. ............. 372/22 |
| 4,747,111 | 5/1988 | Trutna, Jr. et al. .... 372/94 |
| 4,764,933 | 8/1988 | Kozlovsky et al. ..... 372/21 |
| 4,797,896 | 1/1989 | Kane ..................... 372/94 |
| 4,829,537 | 5/1989 | Baer ..................... 372/66 |
| 4,955,034 | 9/1990 | Scerback ............... 372/94 |
| 5,023,477 | 6/1991 | Valley et al. .......... 372/21 |
| 5,027,361 | 6/1991 | Kozlovsky et al. .... 359/328 |
| 5,077,750 | 12/1991 | Pocholle et al. ....... 372/68 |
| 5,086,433 | 2/1992 | Pocholle et al. ....... 372/72 |
| 5,088,096 | 2/1992 | Pocholle et al. ....... 372/20 |
| 5,105,428 | 4/1992 | Pocholle et al. ....... 372/24 |
| 5,123,025 | 6/1992 | Papuchon et al. ...... 372/72 |
| 5,128,948 | 7/1992 | Papuchon et al. ...... 372/212 |
| 5,134,681 | 7/1992 | Ratovelomanana et al. ... 385/13 |
| 5,177,764 | 1/1993 | Nilsson ................. 372/94 |
| 5,227,911 | 7/1993 | Schiller et al. ........ 359/222 |

FOREIGN PATENT DOCUMENTS

| | | |
|---|---|---|
| 0084192 | 7/1983 | European Pat. Off. . |
| 3-266430 | 11/1988 | Japan ............... 385/122 |
| 4-115239 | 4/1992 | Japan ............... 359/328 |
| 4-151627 | 5/1992 | Japan ............... 359/328 |
| 1070570 | 6/1967 | United Kingdom . |

OTHER PUBLICATIONS

IBM Technical Disclosure Bulletin vol. 23, No. 11, Apr. 1981 "Grating Coupling of Light Generated by Forced Nonlinear Optical Processes".
Patent Abstracts of Japan, vol. 12, No. 277(E-640) Jul. 30, 1988. JP-A-63 055 990, Mar. 10, 1988, Soma Hirotoshi, et al. Wave Length Conversion of Laser Light.
Efficient Second-Harmonic Conversion of CW Single-Frequency Nd: YAG Laser Light by Frequency Locking to a Monolithic Ring Frequency Doubler. Optics Letters, vol. 16, No. 13. pp. 992–994. Jul. 1, 1991. D. C. Gerstenberger, et al.
Fused-Silica Monolithic Total-Internal-Reflection Resonator, Optics Letters, vol. 17, No. 5. pp. 378–380. Mar. 1, 1992. S. Schiller, et al.

Primary Examiner—Loha Ben
Assistant Examiner—John Juba, Jr.
Attorney, Agent, or Firm—Oblon, Spivak, McClelland, Maier & Neustadt

[57] ABSTRACT

Disclosed is a non-linear optical device in which the non-linear medium comprises a circular surface on which the light beam to be processed gets reflected. A structure such as this can be used to resolve the difficulties of making mirrors of the cavity containing the non-linear medium.

18 Claims, 5 Drawing Sheets $R_1 > R$

NON-LINEAR OPTICAL DEVICES

BACKGROUND OF THE INVENTION

1. Field of the Invention

The invention relates to a non-linear optical device and notably to a device comprising a non-linear medium contained in a resonant cavity and coupled to a laser beam.

2. Description of the Prior

Many standard devices using non-linear optics (such as optical parametrical oscillators of frequency doublers) are constituted by two essential elements: firstly, the non-linear medium and, secondly, a resonant cavity. The latter is used, in the case of frequency doubling, to increase the conversion efficiency and, in the case of the optical parametrical oscillator (O.P.O.) to produce laser-type beams of adjustable frequency. In the simplest case, the cavity is constituted by two concave mirrors, the faces of which are treated so as to have a high reflection coefficient for the useful wavelength range. The treatment of these mirrors consists of stacks of dielectric layers. They generally constitute one of the following reasons:

It is difficult to manufacture highly reflective mirrors on a wide spectral band (for O.P.O. use). The complexity of the treatment necessary makes the mirror fragile and lower its damage threshold, thus limiting the power that can be admitted into the cavity and the focusing of the beams;

It is difficult to achieve very precise control over the reflection coefficients of the mirrors during manufacture. Furthermore, if it is sought to optimize the overvoltage coefficient of the cavity for the application envisaged, it is necessary to have a series of different transmission mirrors available, thus increasing costs;

The mirrors are made on substrates which must be as transparent as possible in the range of useful wavelengths. Apart from the manufacturing difficulties for certain of these substrates, they often show residual absorption due to impurities which are present in the state of traces (O—H bonds for example) and make the mirrors unusable at the wavelengths that correspond to these absorptions.

It is difficult to make mirrors with good reflection coefficients in the short wavelengths (U.V.) range whereas there are transparent non-linear crystals available in this range;

When the crystal is placed in the cavity, it is necessary for both its faces to be provided with anti-reflection treatment in order to limit the accidental losses which are responsible, in the case of the O.P.O., for a rise in the oscillation threshold. The anti-reflection treatment generally has lower damage thresholds than that of the crystal itself and therefore constitutes a limit to its optimal use.

These drawbacks mean that it is worthwhile to seek a resonant cavity configuration in which the mirror and the multi-dielectric treatment are eliminated.

The invention provides an approach by which these problems are resolved.

SUMMARY OF THE INVENTION

The invention therefore relates to a non-linear optical device comprising a medium made of a non-linear material, wherein the non-linear material comprises optical coupling means enabling a beam to penetrate and to exit at a determined point of the non-linear medium, the beam getting reflected in the non-linear medium several times on the walls of this non-linear medium before emerging therefrom.

BRIEF DESCRIPTION OF THE DRAWINGS

The various objects and features of the invention shall appear more clearly from the following description and from the appended figures, of which.

DETAILED DESCRIPTION OF THE INVENTION

Figure 1:
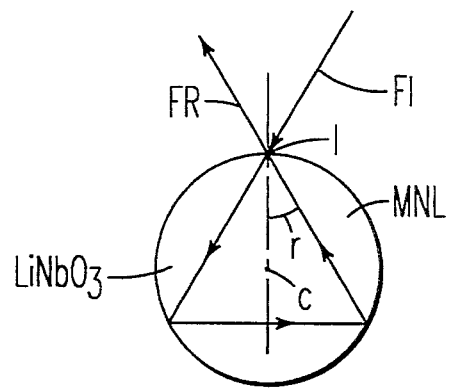
FIG. 1 shows an exemplary embodiment of the device according to the invention.

The general arrangement of the invention consists of a non-linear medium MNL comprising a plane section with a circular shape as shown in FIG. 1. The medium MNL has a refraction index greater than that of the ambient medium in which it is located. An incident beam FI enters the non-linear medium at a point I in a direction contained in the plane of the plane section. This beam has an angle of incidence such that it gets reflected inside the medium MNL and this angle is such that, after several successive reflections, a reflected beam FR emerges from the sphere at the point I.

Figure 2:
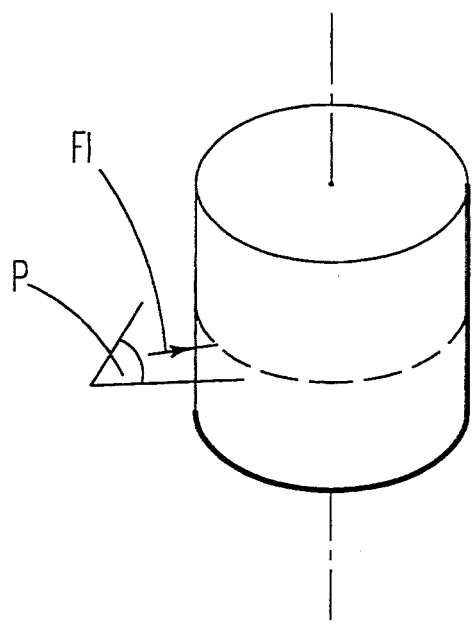
FIG. 2 shows an exemplary embodiment according to the invention wherein the non-linear medium is cylindrical.

The non-linear medium MNL may be a cylinder and the direction of the incident beam is therefore contained in a plane perpendicular to the axis of the cylinder (FIG. 2).

The non-linear medium MNL may also be a sphere. Hereinafter, we shall describe the invention more specifically with the example of the sphere.

The basis principle consists in using the material both as a non-linear medium and as a resonant cavity, the mirrors being replaced by a total reflection on the diopters.

To make the sphere, a standard material such as lithium niobate ($LiNbO_3$) is taken for example. The ordinary index at 1.06 μm is equal to $n_o = 2.23$. The angle of total reflection given by the expression:

$$\sin r = 1/n$$

is equal to $r = 26.6°$

If we consider a sphere of material, several configurations of cavities may be envisaged. The first one uses three total reflections for one cavity rotation as shown in FIG. 1.

Since the angle r is equal to 30°, this configuration is truly in total reflection mode.

Figure 3:
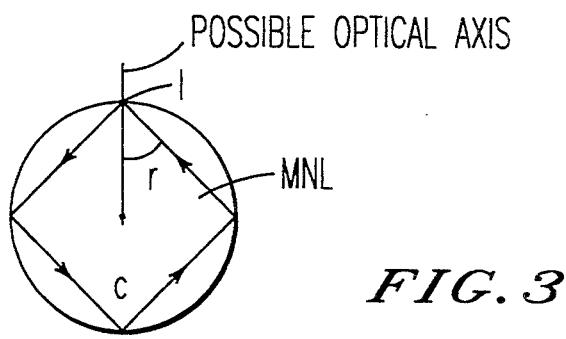
FIG. 3 shows an alternative embodiment of the device according to the invention.

A second configuration, shown in FIG. 3, uses four reflections on the external surface of the sphere, the angle r being equal to 45°.

This configuration may be used if the non-linear material has an index lower than 2, in which case the angle of total reflection is greater than 30°. Configurations with a greater number of reflections may be envisaged.

It should be noted that, since the sphere is perfectly spherical, the beam is automatically propagated in a plane. It is therefore easy to make the beam coincide with the incident beam FI at the point I after a complete rotation in the sphere.

In addition to completely eliminating the mirrors and the multidielectric treatment, this configuration has several advantages:

the entire cavity is filled with active medium, which is an improvement over standard systems where a part of the propagation is done in the air;

the propagation is done automatically in a ring which, in the case of the O.P.O., gives a lower oscillation threshold than for a linear cavity;

the use of a sphere simplifies the manufacture as compared with systems having faces with different radii of curvature. Furthermore, in the case of a sphere, there is no need to specify a particular orientation of the optical axis during manufacture. The optical axis can be oriented by the user. One and the same sphere can therefore be used for a wide variety of applications (O.P.O., doubling, summation etc.) that require different phase-matching angles.

the path of the beam in the sphere is divided into several parts with different orientations. It is possible to envisage configurations where the optical axis of the material of the sphere is oriented so that these different orientations have different non-linear operations corresponding to them.

Figure 4:
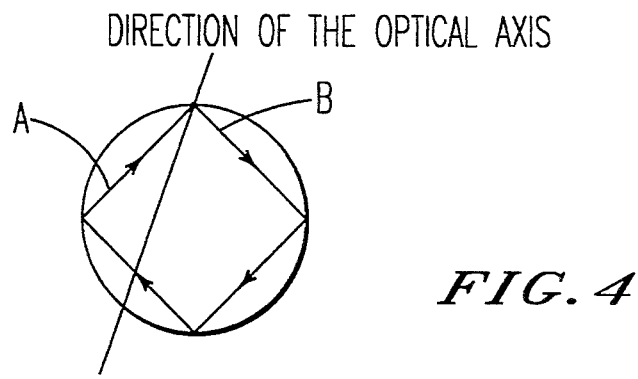
FIGS. 4 and 5 show an example of the working of the device of the invention in successive operations of doubling and summation of frequency.

Taking the example of the non-linear material made of $BaB_2O_4$ (BBO), two successive processes may be envisaged. The first process is the doubling of a pump beam at 1.06 $\mu$m to generate a beam at 532 nm (type II phase matching as described in the document by D. EIMERL, L. DAVIS, S. VELSKO, E. K. GRAMAM, A. ZALKIN, *J. Appl. Phys.*, 62 (5), 1st Sep. 1987, p. 1968; angle: 32.9°). The second process is the summation of frequency between the beam at 1.06 $\mu$m and the beam at 532 nm to generate a beam at 355 nm (type III phase matching as described in the above document by D. EIMERL et al; angle : 59.8°). The sum of these two angles is 92.7°. It is thus seen that if a path with four reflections (FIG. 4) is chosen, the crystal can be oriented so that two successive parts of a path are matched: the first (path A) for the doubling and the second (path B) for the frequency summation.

Figure 5:
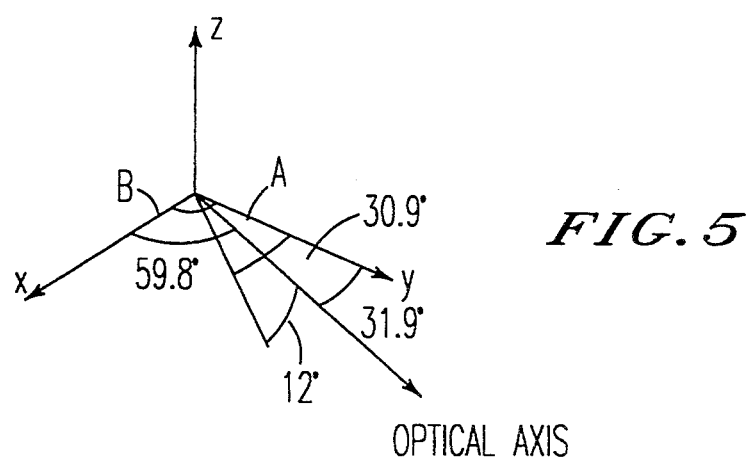

As shown in FIG. 5 for the example of the sphere, axis to make an angle of f12° with the plane of propagation and for its projection in this plane to make an angle of 30.9° with the path A for the two phase matching conditions to be verified sumultaneously.

Since the angle between the optical axis and the propagation plane is small, the directions of the ordinary polarizations (perpendicular to the optical axis and to the wave vector) are close for the paths A and B. The essential part of the pump beam polarized along the ordinary direction for the path A remains polarized along the ordinary direction for the path B. This is also the case for the double frequency wave which, for its part, remains essentially polarized along the extraordinary direction. The essential part of the pump beam at 1.06 $\mu$m and of the beam created by doubling at 532 nm can therefore be used for the frequency summation.

Figure 6:
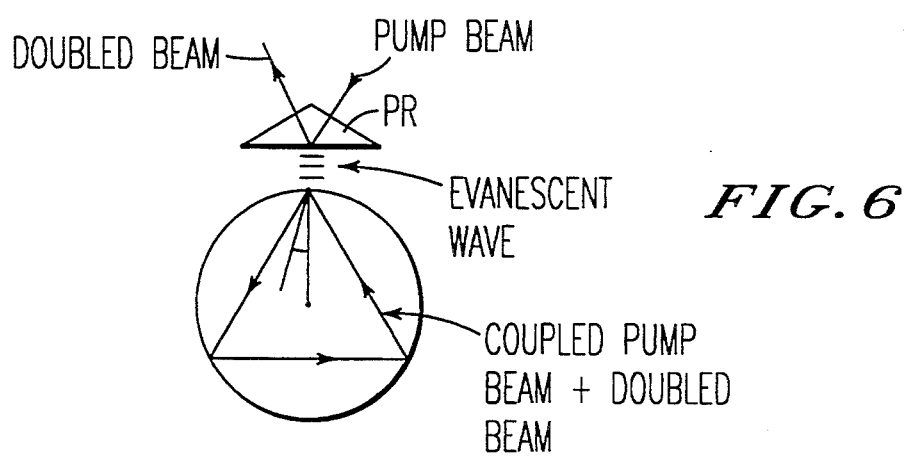
FIGS. 6 and 7 show means for the coupling of the external beams to the cavity constituted by the non-linear medium.

In the case of the coupling of YAG at 1.06 $\mu$m in $LiNbO_3$, the ordinary index at the wavelength of the pump beam is n=2.23 and the total angle of reflexion r=26.6°. Since the angle r should be at least 30° for the configuration with three reflexions, the pump beam cannot be coupled by refraction, even in glancing incidence. It is possible to use a total reflexion prism PR (FIG. 6). It is the evanescent wave existing between the prism and the sphere that provides for the coupling.

If the prism has the same index as the sphere, the angle of incidence of the pump beam on the coupling face of the prism is the same as the angle of incidence of the coupled beam in the sphere.

This coupler can be used to make the pump beam enter, but also serves as an output coupler for the signal. We have a coupler in ring form with a single input-output coupler. By bringing the distance between the prism and the sphere into play, it is possible to adjust the transmission of the coupler, and hence the finesse of the equivalent cavity. It is thus possible to, optimize the losses, for example for an experiment of "squeezing", namely the reduction of the quantum fluctuations of light. It is also possible to optimize the conversion efficiency in the event of doubling, The coupler nevertheless has one drawback. It is not possible to adjust the coupling coefficients separately for the pump beam and the beam with double frequency. If the reflection coefficient is high for one of the two fields, it is high also for the other one. If it is sought to make a resonant cavity, it is necessary to envisage making it for both fields simultaneously, and hence to envisage the phase-shifting of the two fields by a whole number of times $2\pi$ after a rotation in the cavity.

Figure 7:
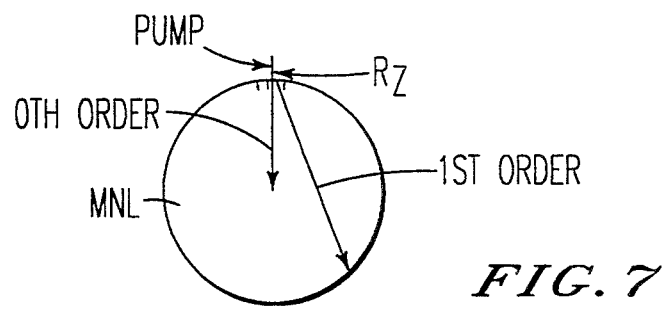

Another means, shown in FIG. 7, for coupling the pump beam in the sphere consists in etching a grating RZ on its surfaces. The high orders of the diffracted pump beam can then be coupled in the sphere.

It is preferable for the surface seen by the beam at each reflection on the walls of the non-linear medium MNL to be spherical and not cylindrical. The beam thus sees a concave mirror at each reflection: this ensures its focusing.

Figure 8:
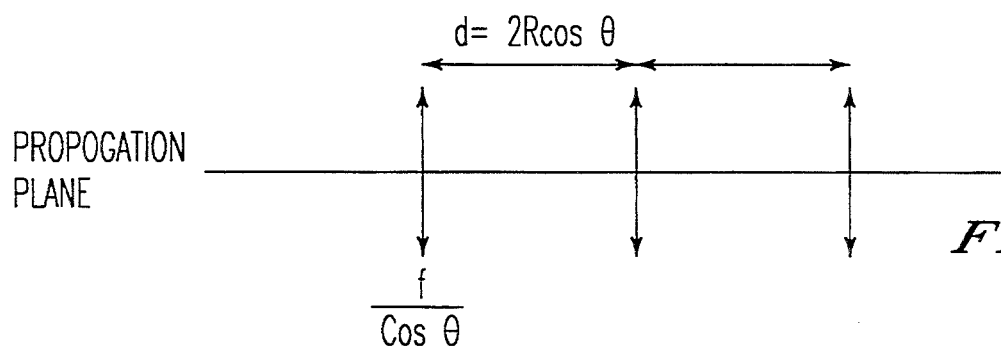
FIGS. 8 and 9 show the working of the device of the invention.
Figure 9:
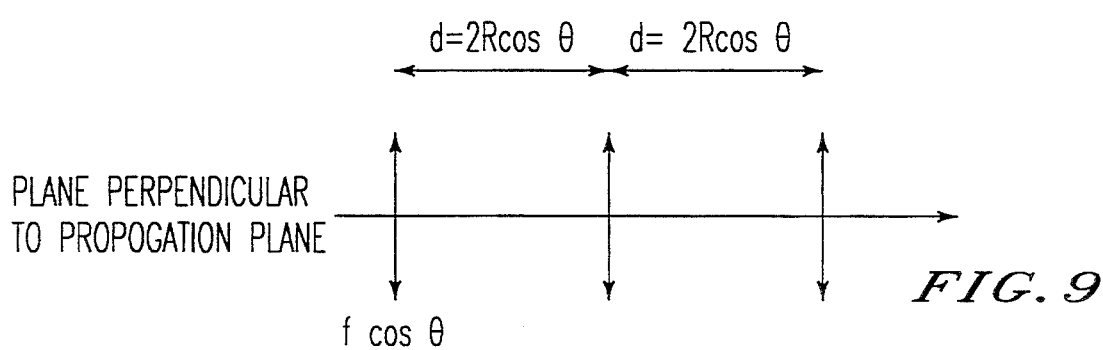
Figure 10A:
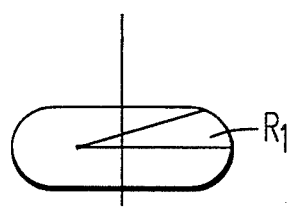
FIGS. 10a and 10b show an alternative embodiment of the device according to the invention.
Figure 10B:
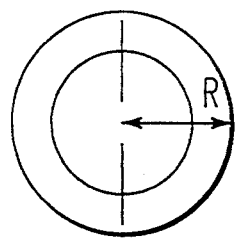

The cavity may be split up into a succession of mirrors with a focal length f=R/2, separated by a distance d which is always strictly smaller than the diameter. Even in the three-reflection configuration, the angle of incidence of the beams on the face is big ($\theta=30°$). There is therefore a strong effect of astigmatism. To take account of this, the cavity must be divided into two parts, one in the propagation plane (see FIG. 8) where the focal length of the mirrors is equal to f/cos $\theta$) and the other in the plane perpendicular to the plane of propagation (see FIG. 9) where the focal lengths diminish and are equal to f cos $\theta$. The distance between two mirrors is d=2R cos $\theta$. FIG. 10a and 10b shown an alternative embodiment of the device according to the invention.

The cavity in the plane perpendicular to the propagation plane has a behavior similar to that of a linear cavity formed by two concave mirrors, the centers of which are merged. It is at the limit of the zone of stability. This may be a major drawback if it is sought to use the sphere as a resonator. To overcome this drawback, it is possible to consider using no longer a sphere but a cylinder, one side of which is convex shaped and has a radius of curvature $R_1$ greater than the radius of the disk in order to compensate for the astigmatism and make the cavity stable.

If the pump beam used is itself astigmatic (as is the case with a laser diode), a part of the astigmatism of the cavity may be allowed to remain so that the proper mode of the cavity has the same astigmatism as the pump beam.

By way of an example, the invention shall now be described with reference to a non-linear medium made of lithium niobate ($LiNbO_3$).

Figure 11:
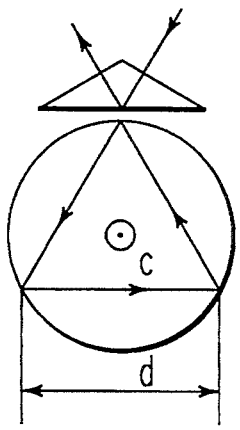
FIGS. 11 and 13 show different possible modes of operation of the device according to the invention.

In lithium niobate, the difference between the extraordinary index and the ordinary index is too small at ambient temperature to obtain the phase matching between 1.06 μm and 532 nm. To achieve this phase matching, it is necessary to effect propagation in a plane perpendicular to the axis c (FIG. 11) in order to maximize the difference between the ordinary index and the extraordinary index and then to heat the crystal in order to increase this difference. The doubling is thus obtained around 120° C.

We shall consider the three-reflection configuration, and an optical axis perpendicular to the plane of propagation.

Figure 12:
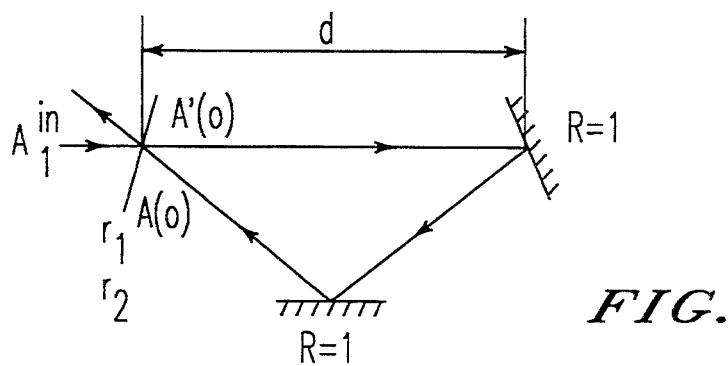
FIG. 12 shows a modelization of the operation.

The resonator is schematically taken to be a three-mirror ring cavity with only one coupling mirror (FIG. 12). The amplitude of the field is referenced A before reflection on a mirror and A' just after the reflection. Only one field shall be considered to enter the cavity: this is the pump field referenced $A_1^{in}$. The index 1 relates to the pump field and the index 2 to the signal field created by frequency doubling. The origin of the positions is taken at the coupler. The distance between two mirrors is equal to d.

Between two mirrors, the pump and signal fields undergo phase shifts due to the propagation. These phase shifts are respectively equal to $K_1 d$ and $k_2 d$.

$k_1$ is the wave vector for the field $A_1$.

$k_2$ is the wave vector for the field $A_1$.

At reflection, they undergo phase shifts equal respectively to $\phi_1$ and $\phi_2$. These phase shifts assume values between 0 and $\pi$ and depend on the angle of incidence. The pump field is polarized in the ordinary direction so as to be capable of meeting the phase matching condition. It is therefore perpendicular to the direction of propagation and perpendicular to the optical axis. In the configuration being considered, it is therefore in the plane of incidence: it is therefore a TM mode. If the external medium is taken to be air, then its phase shift at reflection is:

$$\phi_m = 2 \arctan\left( \sqrt{\frac{n^2 \sin^2\Theta - 1}{\cos^2 \Theta}} \right)$$

where $\theta$ is the angle of incidence assumed to be greater than the angle of total reflection.

The signal field is, for its part, polarized in the extraordinary direction. It is perpendicular to the plane of incidence; it is in TE mode. Its phase shift at reflection is written as follows:

$$\phi_e = 2\arctan\left( \frac{\sqrt{n^2\sin^2\Theta - 1}}{n \cos \Theta} \right)$$

The equations of the fields on the coupling mirror are:

$$A'_1(0) = t_1 A_1^{in} + r_1 A_1(0) e^{\phi 1} \{r_1^2 + t_1^2 + t_1'^2 = 1\}$$

$$A'_2(0) = r_2 A_2(0) e^{i\phi 2}$$

where $r_1$ and $r_2$ are the reflection coefficients of the mirror $t_1$ and $t_2$ are the transmission coefficients of the mirror.

The amplitude of the field created by non-linear effect between the coupling mirror and the mirror located at the distance d from this coupling mirror is:

$$A_2(d) = \left[ A'_2(O) + \chi d A'^2_1(O) e^{\frac{i\Delta k d}{2}} \sin\left(\frac{\Delta k d}{2}\right) \right] e^{ik_2 d}$$

$\Delta kd = (2k_1 - k_2)d$ is the divergence from the phase-matching condition.

$\chi$ is the non-linear coefficient.

Two effects come into play in the expression of the field $A_2(0)$ in the cavity: firstly the non-linear conversion and, secondly, the resonance conditions of the pump and signal beams. Since the coupler used works by means of an evanescent beam, it is difficult to check the coupling of one of the two fields independently of the other one. It is therefore necessary to seek the condition of resonance for both fields simultaneously.

The divergence from the phase-matching condition can be adjusted continuously around the zero value. It is possible, for example, to bring the temperature of the crystal into play. One way of meeting the condition of resonance for the two fields and of optimizing the non-linear coupling is to adjust $\Delta k$ so that:

$$2\phi_1 + 2k_1 d = \phi_2 + k_2 d$$

The phase shift undergone by the signal field (propagation over a distance d plus a reflection) is double that undergone by the pump field. If the pump field is resonant on one cavity rotation $$(3(\phi_1 + k_1 d) = 2k\pi),$$

the signal field is automatically resonant $$(3(\phi_2 + k_2 d) = 4k\pi).$$

To adjust the resonance cavity, the total optical length of the cavity is modified by about one pump wavelength. This may be obtained by a variation of the geometrical length by means of a piezoelectrical shim, or by a variation of index by electro-optical effect.

The only limitation on this type of adjustment arises out of the fact that $\Delta k$ is not zero and hence that sinc ($\Delta k d/2$) is lower than 1, which reduces the efficiency of conversion.

Let us consider a three-reflection configuration: the angle of incidence is then equal to $\theta \sim 30°$. In the case of the doubling at 1.06 μm in $LiNbO_3$, the indices seen by the pump beam and by the signal beam are almost identical:

$$n(532\ nm) \sim n_o(1{,}064\ \mu m) = 2.23$$

Since the pump field is in TM mode and the signal field is in TE mode, the following are obtained for the phase shifts:

$$\phi_1 - \phi_m = 104°$$

$$\phi_2 = \phi_e = 29°$$

whence $$2\phi_1 - \phi_2 = 179° = 3.12\ \text{rad}$$ In this case, we have:

$$\Delta kd = 3.12$$

and $$\text{sinc}\left(\frac{\Delta kd}{2}\right) = 0.64$$

This reduction in coupling remains moderate. The effective length of the crystal is then equal to:

$$l_{eff} = 0.64 \times 3d = 1.92$$

whereas it was equal to d if only one of the paths verified the phase matching condition in the crystal. Furthermore, the cavity can be made resonant for the signal. This amounts to increasing the effective length of the crystal, to an extent that increases with the finesse.

With the value that $\Delta kd$ should assume being known, it is possible to deduce the necessary value of the difference between the pump indices $n_1$ and $n_2$:

$$n_1 - n_2 = \frac{\lambda_p}{4\pi d}(\Delta kd)$$

If we consider a ball with a diameter of 3 mm, d is equal to 2.6 mm. We then obtain:

$$n_1 - n_2 = \times 10^{-4}$$

This corresponds to a variation of the order of one degree with respect to the phase matching temperature.

As an example, a description shall also be given of the working of the system of the invention with a non-linear medium of LiNbO working as a doubler at 820 nm.

In the case of LiNbO$_3$, the phase matching cannot be obtained by birefringence if it is sought to double a beam at 820 nm. The difference between the indices is far too high:

As has been seen in the previous paragraph, the efficiency of the doubling depends on the term $\Delta kd$. In this case, to compensate for the high value of $\Delta kd$ due to the great difference between indices, it is enough to reduce the value of d, i.e. the length of the path between two successive reflections. This makes it necessary to increase the number of reflections.

The way to obtain the following relationship is shown:

$$\Delta kd = -(2\phi_1 - \phi_2) \quad (a)$$

The angle of incidence of the beam on the diopter may be almost equal to $\pi/2$. In this case, the phase shifts at reflection $\phi_1$ and $\phi_2$ tend towards $\pi$. We therefore have:

$$\Delta kd = -\pi \quad (b)$$

In the case of a normal dispersal, the index $n_1$ seen by the pump beam is lower than the index $n_2$ seen by the double frequency beam. The expression of $\Delta k$;

$$\Delta k = 4\pi/\lambda_p(n_1 - n_2) \quad (c)$$

shows that this parameter is negative, and therefore that the relationship (b) can effectively be achieved by an appropriate choice of d. The phase shift due to the divergence from the phase matching condition is then compensated for by the phase shifts at reflection. Thus, an artificial phase matching is achieved.

In this case, it can be shown that the effective length of interaction is:

$$l_{eff} = Nd2/\pi$$

There is a factor $2/\pi$ between the effective length and the geometrical length travelled (Nd). As in the previous case, the relationship (a) allows a simultaneous resonance of both fields to be had by means of a variation of the total optical length of the path travelled.

From the expression (c), it is possible to deduce the value of d enabling verification of the relationship (b):

$$d = \lambda_p / 4(n_1 - n_2)$$

which, in our case, gives d = 2.86 $\mu$m.

Figure 13:
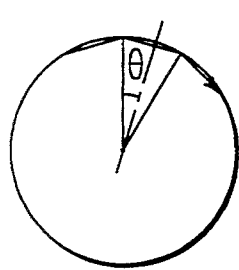

The diameter of D of the sphere used being known, it is then possible to deduce the number of reflections N therefrom, as well as the angle $\theta$ (FIG. 13) between the pump beam and the diopter:

$$N \sim \frac{\pi D}{d} \sim \frac{2\pi D(n_1 - n_2)}{\lambda_p}$$

$$\Theta = \frac{d}{D} = \frac{\lambda_p}{4(n_1 - n_2)}$$

For a ball with a diameter of 3 mm, we obtain:

$$N \sim 3300$$

$$\Theta = 9.5 \times 10^{-4}\ \text{rad}$$

Another possibility offered by this system is that of achieving an artificial phase matching for pump and signal fields polarized in the same direction. In the case of LiNbO$_3$, it is thus possible to use the smallest non-linear coefficient ($d_{33}$) which makes it necessary for the two fields to be polarized in parallel to the axis c.

In the case of a propagation in the plane perpendicular to this axis, the two fields then have a polarization TE. Since the angles of incidence of the two beams are close to $\pi/2$, the phase shifts at reflection are close to $\pi$. The distance d is given by the same expression as in the previous case:

$$d = \lambda_p/4(n_1 - n_2)$$

The indices have the following value:

$$n_e(0.82\ \mu) = 2.17$$

$$n_e(0.41\ \mu) = 2.32$$

We obtain d = 1.37 μm.

Figure 14:
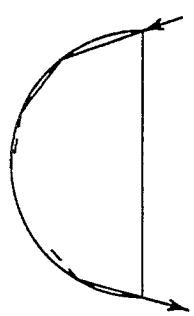
FIGS. 14 to 16 show alternative embodiments of the invention.

According to one alternative embodiment, the device of the invention is made in the form of a semi-sphere. The beam enters the semi-sphere as shown in FIG. 14 and emerges at a diametrically opposite point.

Figure 15:
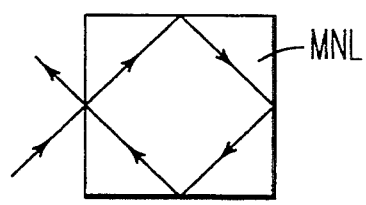

In the foregoing, we have described devices in which the non-linear media MNL possess a circular section. However, according to one alternative embodiment, this section is polygonal. For example, as shown in FIG. 15, this section may be square shaped.

Figure 16:
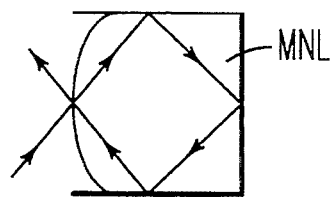

Furthermore, according to the alternative embodiment shown in FIG. 16, the beam incoming face is curved so as to facilitate the coupling as described with reference to FIG. 6.

What is claimed is:

1. A non-linear optical device comprising:
   a non-linear medium made of an optically non-linear material,
   means for directing a laser beam at a determined single point of said medium and at a determined angle relative to said medium,
   wherein the non-linear medium comprises optical coupling means enabling said beam both to enter said medium and to exit said medium at said determined single point of the non-linear medium,
   wherein said beam is oriented relative to said medium so that the beam gets totally internally reflected in he non-linear medium several times on the walls of the non-linear medium before emerging therefrom,
   wherein a diffraction grating is etched in the surface of the non-linear medium at said determined single point, said grating for optically coupling said beam to said medium.

2. A non-linear optical device, comprising:
   a non-linear optical medium made of an optically non-linear material, said medium being in the form of a sphere,
   means for generating a coherent optical beam and directing that coherent optical beam toward said non-linear medium, wherein said non-linear medium has ordinary and extraordinary directions for beam propagation and said beam has an orientation relative to said non-linear optical medium satisfying frequency doubling and frequency summation conditions,
   wherein a surface portion of said sphere exists through which said beam both enters and exits said sphere, and entering and exiting portions of said beam overlap in said surface portion.

3. A non-linear optical device, comprising:
   a non-linear optical medium made of an optically non-linear material, said medium being in the form of a sphere,
   means for generating a coherent optical beam and directing that coherent optical beam toward said non-linear medium, wherein said non-linear medium has ordinary and extraordinary directions for beam propagation and said beam has an orientation relative to said non-linear optical medium satisfying frequency doubling and frequency summation conditions,
   wherein said coherent optical beam is oriented relative to the spherical non-linear optical medium so that the optical path of the beam inside the non-linear optical medium forms a square.

4. A non-linear optical device, comprising:
   a non-linear optical medium made of an optically non-linear material, said medium being in the form of a sphere,
   means for generating a coherent optical beam and directing that coherent optical beam toward said non-linear medium, wherein said non-linear medium has ordinary and extraordinary directions for beam propagation and said beam has an orientation relative to said non-linear optical medium satisfying frequency doubling and frequency summation conditions,
   wherein said beam is oriented relative to said non-linear optical medium so that the path of said beam inside said non-linear optical medium forms an equilateral triangle.

5. A non-linear optical device comprising:
   a non-linear optical medium made from a non-linear optical material;
   coupling means, comprising an optical grating on the surface of the non-linear optical medium, for coupling a coherent optical beam into said non-linear medium at a first surface region of said non-linear optical medium;
   beam generating means for generating and directing said beam towards said coupling means for coupling into said non-linear optical medium;
   wherein the orientation of said beam generating means relative to said non-linear medium is such that a portion of the beam that is being coupled into said non-linear medium and a portion of the beam that is being coupled out of said non-linear medium, overlap at said first surface region,
   wherein the non-linear medium is cylindrical.

6. A non-linear optical device, comprising:
   a non-linear optical medium made of a non-linear optical material;
   coupling means, comprising an optical grating on the surface of the non-linear optical medium, for coupling a coherent optical beam into said non-linear medium at a first surface region of said non-linear optical medium;
   beam generating means for generating and directing said beam towards said coupling means for coupling into said non-linear optical medium;
   wherein the orientation of said beam generating means relative to said non-linear medium is such that a portion of the beam that is being coupled into said non-linear medium and a portion of the beam that is being coupled out of said non-linear medium, overlap at said first surface region,
   wherein said non-linear medium is cylindrical having a cylindrical diameter and an end surface of the cylinder is a curved surface whose radius of curvature is greater than the cylindrical diameter.

7. A non-linear optical device, comprising:
   a non-linear optical medium made of a non-linear optical material;
   coupling means, comprising an optical grating on the surface of the non-linear optical medium, for coupling a coherent optical beam into said non-linear medium at a first surface region of said non-linear optical medium;
   beam generating means for generating and directing said beam towards said coupling means for coupling into said non-linear optical medium;
   wherein the orientation of said beam generating means relative to said non-linear medium is such that a portion of the beam that is being coupled into said non-linear medium and a portion of the beam that is being coupled out of said non-linear medium, overlap at said first surface region.

8. A non-linear optical device according to one of claims 5–7, wherein a beam path of said beam inside said non-linear medium forms a generally polygonal shape.

9. A non-linear optical device according to one of claims 5–7, wherein the first surface region of said non-linear medium is curved.

10. A non-linear optical device according to one of claims 5–7, wherein said optical beam is totally internally reflected in the non-linear medium except at said first surface region.

11. A non-linear optical device, comprising:
a non-linear optical medium made of a non-linear optical material;
coupling means, comprising one of an optical material in the form of a prism located adjacent said optical medium and an optical grating on the surface of the non-linear optical medium, for coupling a coherent optical beam into said non-linear medium at a first surface region of said non-linear optical medium;
beam generating means for generating and directing said beam towards said coupling means for coupling into said non-linear optical medium;
wherein said non-linear medium is in the form of a hemisphere, said hemisphere having a flat circular surface and a curved hemispherical surface; and
wherein said beam generating means and said hemisphere are positioned such that said beam enters said hemisphere through said flat circular surface and undergoes a plurality of total internal reflections at said hemispherical surface prior to exiting said hemisphere through said flat circular surface.

12. A non-linear optical device according to claim 11, wherein:
the optical beam has an orientation relative to said non-linear medium satisfying frequency doubling and frequency summation conditions.

13. A non-linear optical device, comprising:
a non-linear optical medium made of a non-linear optical material;
coupling means, comprising one of an optical material in the form of a prism located adjacent said optical medium and an optical grating on the surface of the non-linear optical medium, for coupling a coherent optical beam into said non-linear medium at a first one of a plurality of surface regions of said non-linear optical medium;
beam generating means for generating and directing said beam towards said coupling means for coupling into said non-linear optical medium;
wherein the orientation of said beam generating means relative to said non-linear medium is such that a portion of the beam that is being coupled into said optical medium and a portion of the beam that is being coupled out of said optical medium, overlap at said first one of said plurality of surface regions;
wherein the surface structure of said optical medium and the orientation of said optical medium is such that said beam propagates inside said optical medium along a plane of propagation and reflects from said plurality of surface regions of said optical medium, said beam forms a first angle of incidence of $\theta$ when impinging on a second one of said plurality of surface regions, said second one of said plurality of surface regions has a first focal length in the plane of propagation and a second focal length in a plane that is perpendicular to the plane of propagation and the first focal length is greater than the second focal length.

14. A non-linear optical device according to claim 13, wherein the orientation of said beam generating means relative to said optical medium is such that said beam impinges onto each of said plurality of surface regions with a non-zero angle of incidence.

15. A non-linear optical device according to claim 14, wherein said angle of incidence is about 30 degrees.

16. A non-linear optical device according to claim 13, wherein a ratio of the first focal length to the second focal length is related to the first angle of incidence by the relation:

(first focal length) /(second focal length)$=1/\cos^2(\theta)$.

17. A non-linear optical device according to claim 16, wherein at least two of said plurality of surface regions have a curvature in the plane of propagation and a different curvature in the plane that is perpendicular to the plane of propagation.

18. A non-linear optical device according to claim 13, wherein at least two of said plurality of surface regions have a curvature in the plane of propagation and a different curvature in the plane that is perpendicular to the plane of propagation.

* * * * *